(12) United States Patent
Bolder et al.

(10) Patent No.: US 7,581,207 B2
(45) Date of Patent: Aug. 25, 2009

(54) METHOD OF CONFIGURING MANAGED ENTITIES IN A COMMUNICATIONS NETWORK USING CONFIGURATION TEMPLATES

(75) Inventors: Ronald Scott Bolder, Nepean (CA); Chi Zhang, Nepean (CA)

(73) Assignee: Alcatel Lucent, Paris (FR)

( * ) Notice: Subject to any disclaimer, the term of this patent is extended or adjusted under 35 U.S.C. 154(b) by 1082 days.

(21) Appl. No.: 10/726,532

(22) Filed: Dec. 4, 2003

(65) Prior Publication Data

US 2005/0138557 A1 Jun. 23, 2005

(51) Int. Cl.
G06F 9/44 (2006.01)
G06F 11/00 (2006.01)

(52) U.S. Cl. .................. 717/122; 717/103; 717/170; 714/738

(58) Field of Classification Search ................. 717/120
See application file for complete search history.

(56) References Cited

U.S. PATENT DOCUMENTS

| | | | | |
|---|---|---|---|---|
| 6,308,205 | B1 * | 10/2001 | Carcerano et al. | 709/221 |
| 6,463,528 | B1 | 10/2002 | Rajakarunanayake | |
| 6,560,604 | B1 * | 5/2003 | Fascenda | 707/10 |
| 6,594,695 | B1 * | 7/2003 | Vasamsetti et al. | 709/220 |
| 6,785,706 | B1 * | 8/2004 | Horman | 709/203 |
| 7,305,659 | B2 * | 12/2007 | Muller et al. | 717/127 |
| 2004/0268298 | A1 * | 12/2004 | Miller et al. | 717/106 |

OTHER PUBLICATIONS

"Using observation and refinement to improve distributed systems test", Carr et al., Apr. 2003, pp. 1-7. Online retrieved at <http://ieeexplore.ieee.org/stamp/26736>.*
"Using XML as a flexible, portable test script language", Johnson et al., Dec. 2003, pp. 1-6. Online retrieved at <http://ieeexplore.ieee.org/stamp/01243576>.*

* cited by examiner

Primary Examiner—Tuan Q Dam
Assistant Examiner—Thuy Dao

(57) ABSTRACT

The advantages are derived from a cost-reduced managed entity configuration of various communications network equipment having diverse makes, models, and software releases. Expertise of highly trained analysts is employed in a time-efficient manner to write discrete parameterized configuration script templates for maximum re-use, thereby reducing the number of scripts that they are required to maintain and deploy with each update. Script execution dependencies and version information associated with script templates enable script dependency checking, script version control, and customization of scripts for target managed entity reducing exposure to errors in performing managed entity configuration tasks. Network management personnel with little or no command line interface configuration knowledge merely select and populate parameters for scripts required to perform required configuration tasks enhancing configuration management cost-effectiveness. Faster support for new managed entities and features is provided via the configuration task specific script templates.

39 Claims, 1 Drawing Sheet

METHOD OF CONFIGURING MANAGED ENTITIES IN A COMMUNICATIONS NETWORK USING CONFIGURATION TEMPLATES

FIELD OF THE INVENTION

The invention relates to configuration management in a network management context, and in particular to methods of configuring large numbers of managed entities in a communications network employing configuration templates.

BACKGROUND OF THE INVENTION

In the field of communications network management a lot of management resources are expended in performing configuration management, and in particular for configuring routers in packet-switched communications networks.

Routers are Open Systems Interconnect (OSI) Layer-3 (L3) communications network entities directing packets between source communications network nodes and destination communications network nodes in packet-switched communications networks. A typical communications network deployment employs a multitude of routers of various makes, types and software releases.

By far, the most common method of configuring a router includes employing Command Line Interface (CLI) commands. Unfortunately CLI command sets are not standardized and may even vary across a single vendor's equipment portfolio. As a result, a lot of resources are being expended in training network management personnel to be adept at configuring any and all router makes and types, i.e. mastering a huge CLI command set the complexity of which increases with each router software release. Despite large amounts of resources being expended in training network management personnel gaining experience in configuring routers, human error is a further factor which can not be ignored particularly when it comes to configuring high capacity routers.

To alleviate the problem of configuring routers, some communications network operators employ a group of highly trained analysts to write full equipment configuration CLI scripts for each one of a variety of L3 equipment employed in a managed communication network. Such complex CLI scripts are then made available to less highly trained. personnel, at least with respect to CLI configuration of L3 equipment, who execute the scripts on the various L3 equipment as these are required to be configured. Although this approach reduces configuration costs by utilizing the highly trained analyst expertise only for CLI script creation, it has a disadvantage in terms of script re-use. Specifically, the entire CLI scripts must often be customized, by highly trained analysts who are familiar with software release specific CLI command sets/parameters, because typically some of the CLI commands employed are, and have parameters that are, software release specific. Manually customizing the entire CLI scripts for each router software release is not the most efficient way to re-use the CLI scripts as it is time consuming and error prone.

An alternative to using scripts is to fully model a router and associated L3 objects such as, but not limited to: interfaces, routing protocols, and Internet Protocol (IP) links, etc. associated therewith; and then use a Network Management System (NMS) to configure the modeled routers and objects associated therewith. This approach suffers from a disadvantage of not allowing for easy configuration of new managed objects because to model the new managed objects and their interactions requires changes to the NMS software.

Modifying NMS software to support the introduction of new managed objects via updated router operating software releases of various routing equipment vendors at various times, is time-consuming and costly because of the workload required to implement such changes, testing and distribution of the updated NMS software. Furthermore, desiring to keep the number of NMS software updates to a manageable level would mean that there would always be a lengthy time lag in providing support for the new managed objects between the introduction of the new managed objects by router equipment vendors and those supported by the NMS.

Developments towards these ends include a prior art U.S. Pat. No. 6,463,528 entitled "Method and Apparatus for Simplifying the Configuration of Several Models of Customer Premise Equipment" which issued on Oct. 8, 2002 to Rajakarunanayake et al. which describes automatically configuring various makes and models of routers with Internet Protocol (IP) addresses and IP masks at install time. Rajakarunanayake et al. teach the use of a single parameterized script that is automatically populated with stored and user-specified parameters. Employing a single configuration script may be adequate for simple router configurations such as providing a single setting, however in accordance with the Rajakarunanayake et al. teachings large complex scripts have to be employed in configuring other then a single setting on a router. Writing complex large configuration scripts must have hard-coded therein correct sequencing of CLI commands, however the opportunities for re-using such complex large scripts are reduced.

Therefore, means for easily and efficiently configuring numerous routers of various makes, models, and software release is required.

SUMMARY OF THE INVENTION

In accordance with an aspect of the invention, a script management system is provided. A script repository retrievably stores a plurality of parameterized command script templates. At least one command specification constituent of a command script template specifies a user parameter identifier. A managed entity configuration management module populates parameterized command script templates in deriving corresponding command scripts therefrom.

In accordance with another aspect of the invention, a managed entity configuration human-machine interface provides: entering a user parameter value for the user parameter identifier, saving the user parameter value with a repository, optionally requesting the user parameter value from repository, optionally retrieving the user parameter value from the repository, optionally editing the user parameter value, and optionally deleting the user parameter value.

In accordance with a further aspect of the invention, the command script template is stored in the script repository along with a command script template version identifier. User parameter values corresponding to command specifications constituent of the command script template are stored in a user parameter set having a user parameter set version identifier. The script management system further includes a versioning module inspecting the command script template version identifier and the user parameter set version identifier to ensure correspondence therebetween.

In accordance with a further aspect of the invention, the managed entity configuration management module further includes means for requesting additional user parameter values to be entered via the managed entity configuration human-machine interface when discrepancies arise between a command script template version identifier and a user parameter set identifier.

In accordance with a further aspect of the invention, at least one command constituent of the command script template further specifies a network management system parameter identifier. The managed entity configuration management module further includes means for obtaining a corresponding managed entity parameter value from one of a network management system and an network management system database.

In accordance with a further aspect of the invention, each command script template further includes an associated script execution dependency specification identifying at least one command script required to be executed in advance thereof. The script management system further includes a script sequencer which inspects the script execution dependency specification of at least one command script derived from a corresponding command script template to determine whether an at least one additional command script is required to be executed in advance thereof. The submitted and the additional command scripts represent an apply list of scripts. The. script execution dependency specification and the script sequencer enable the use of specific command script templates in respect of discrete configuration tasks, and script execution dependency specified combinations specifying complex communications network managed entity configurations tasks.

In accordance with a further aspect of the invention, the script execution dependency specification further includes a script execution dependency table.

In accordance with a further aspect of the invention, the managed communications network entity configuration management module further submits sequenced command scripts to at least one target managed communications network entity for execution in configuring thereof.

In accordance with a further aspect of the invention, the script management system includes a managed entity configuration human-machine interface having means for: target managed entity selection, command script template selection, and submission of the command script template selection for configuration of at lest one selected target managed entity to the managed communications network entity configuration management module.

In accordance with a further aspect of the invention, the script management system includes an analyst human-machine interface having means for: command script template creation, submission of the command script template to the script repository for storage, optional retrieval of the command script template, and optional modification of the command script template.

In accordance with a further aspect of the invention, the analyst human-machine interface includes means for: script execution dependency specification.

In accordance with a further aspect of the invention, the analyst human-machine interface includes means for: command script execution authorization specification in respect of a command script template.

In accordance with a further aspect of the invention, a recording medium including at least one parameterized command script template is provided.

In accordance with a further aspect of the invention, the recording medium further includes a user parameter set.

In accordance with a further aspect of the invention, the recording medium includes a parameterized command script template further having an associated version specification, and a user parameter set further having an associated version specification.

In accordance with a further aspect of the invention, the recording medium includes a command script template of a plurality of command script templates which has a script execution dependency specification specifying a command script derived from one other command script template to be submitted for prior execution.

In accordance with a further aspect of the invention, a method of configuring communications network a managed entity is provided. At least one parameterized script template is selected from a plurality of parameterized script templates based on a configuration task to be performed on the managed entity. The parameterized command script template is populated with at least one parameter value to derive a command script in respect of the configuration task. The command script is submitted to the managed entity for execution.

In accordance with a further aspect of the invention, the parameterized command script template is populated with user parameters from a stored user parameter set.

In accordance with a further aspect of the invention, versions of the parameterized command template and of the user parameter sets are compared in populating the parameterized command script template with user parameter values. Network management personnel is prompted for missing user parameter values.

In accordance with a further aspect of the invention, the parameterized command script template is populated with a network management system parameter value obtained from one of a network management system and a network management system database.

In accordance with a further aspect of the invention, a command script template further includes a script execution dependency specification specifying command scripts required to be executed before the corresponding command script. The method further includes ordering the plurality of command script templates in the apply list.

In accordance with yet another aspect of the invention, the method includes determining that a script execution dependency specification specifies a command script not currently a member of the apply list, and retrieving the corresponding command script template from a script repository for inclusion in the apply list.

The advantages are derived from a cost-reduced managed entity configuration of various diverse makes, models, and software releases in a communications network. Expertise of highly trained analysts is employed in a time-efficient manner to write discrete parameterized configuration script templates in respect of specific configuration tasks for maximum re-use, thereby reducing the number of scripts that they are required to write. Script execution dependencies and version information associated with script templates enable script dependency checking, script version control, and customization of scripts for target managed entity reduces exposure to errors in performing managed entity configuration tasks. Network management personnel with little or no CLI command knowledge merely select and populate parameters for scripts required to perform required configurations enhancing the cost-effectiveness of configuration management. Faster support for new managed entities and features is provided via script templates.

BRIEF DESCRIPTION OF THE DRAWINGS

The features and advantages of the invention will become more apparent from the following detailed description of the exemplary embodiment with reference to the attached diagrams wherein.

Figure 1:
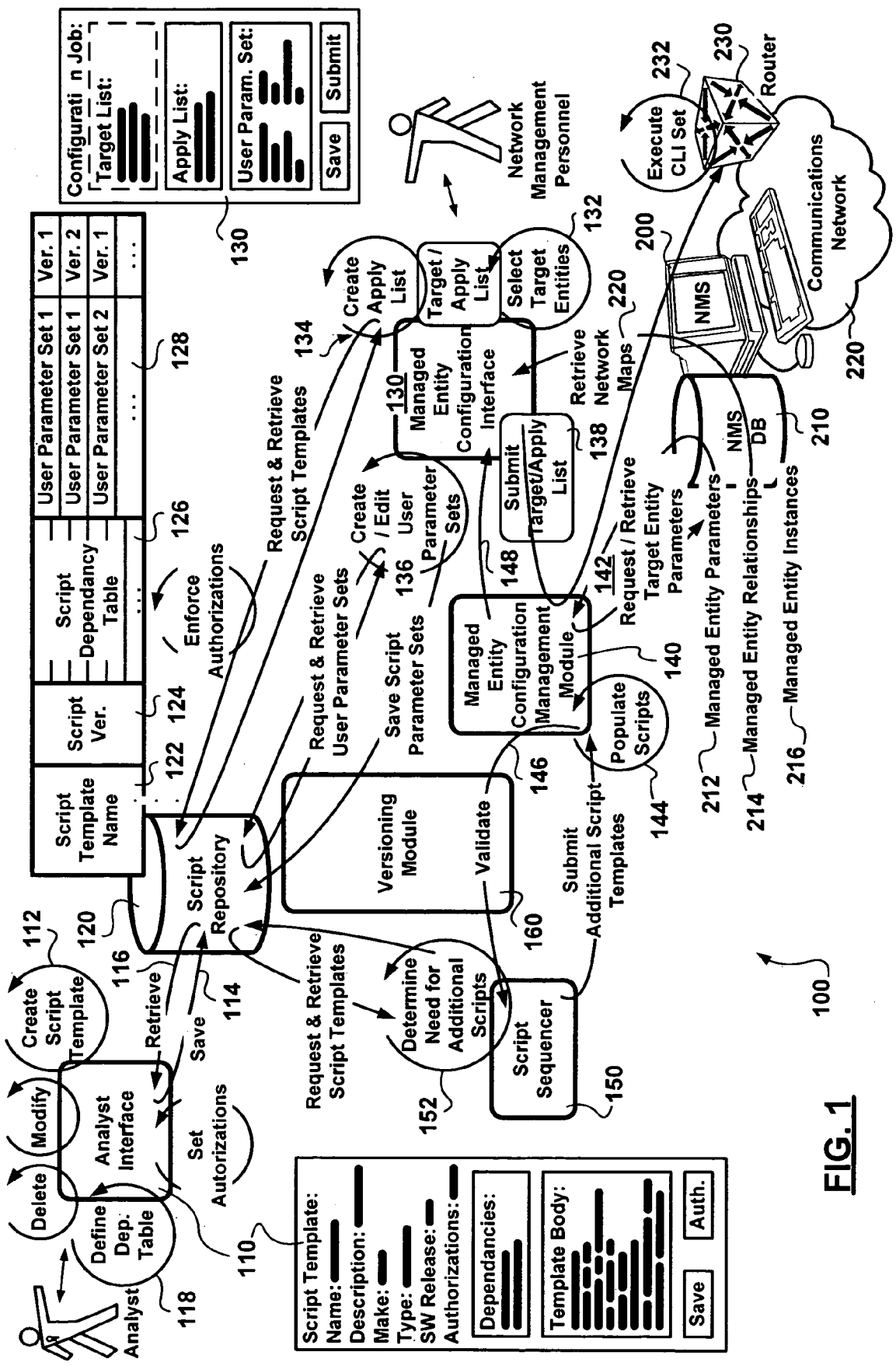
FIG. 1 is a schematic diagram showing, in accordance with the exemplary embodiment of the invention, inter-operating elements implementing a script management system.

It will be noted that in the attached diagram like features bear similar labels.

DETAILED DESCRIPTION OF THE EMBODIMENTS

Making exemplary reference to FIG. 1, operational simplifications are sought in configuring Command Line Interface (CLI) command configurable managed entities 230 in a managed communications network 220 wherein network management personnel is provided with a communications network managed entity CLI configuration means which does not require extensive knowledge of CLI commands.

In accordance with a preferred embodiment of the invention, a script management system 100 for performing operations on parameterized CLI script templates 122 to generate managed entity target specific scripts is provided.

An analyst is provided with an interface, such as but not limited to, a Graphical User Interface (GUI) 110 which enables the analyst to create 112, save 114, retrieve 116, modify, delete, etc. specific discrete parameterized CLI command script templates 122, as well to define script execution dependencies 118, and perhaps to define execution authorization contexts.

Although the invention will be described herein in respect of parameterized CLI command script templates, the invention is not limited to CLI script template specification. The script management system 100 processes parameterized script templates into command scripts. The parameterized script templates may be written employing other types of (interface command) languages such as, but not limited to: Node Management Terminal Interface (NMTI), and Transaction Language I (TLI), eXtensible Markup Language (XML), etc.

In accordance with the exemplary embodiment of the invention, a script dependency table 126 is associated with each script template 122 to enable proper script ordering in configuring a target managed entity.

In accordance with the exemplary embodiment of the invention, each script template 122 is written to perform a single discrete managed entity configuration task and the corresponding dependency table 126 enables the specification of prerequisite scripts which must be executed before the subject script is executed.

The parameterized CLI command script templates 122 would typically be written by highly trained analysts familiar with respective equipment vendors' CLI command sets; each CLI command employed in a script template having the following exemplary format:

CommandName<UserParamID|valid-range|default-value>/<NMSParamID>...

where CLI command parameters of the type "User Parameter IDentifier" are intended to be populated 136 by network management personnel prior to submitting 138 the corresponding CLI command script for execution 232 on the corresponding target managed entity 230, with a corresponding value in the "valid range" specified, else the "default value" being employed; and CLI command parameters of the type "NMS Parameter IDentifier" are intended to be populated 144, upon submission 138, with managed entity parameters 212 supplied via a Network Management System (NMS) 200 exemplary from an NMS DataBase (DB) 210 as will be described herein below.

The script management system 100 includes an associated script repository 120 storing parameterized CLI command script templates 122 along with a script version specification 124, a script execution dependency table 126, and user parameter sets 128 each having a version identifier.

Network management personnel is provided with a managed entity configuration Graphical User Interface (GUI) 130 for:
  target entity selection 132 via a network map provided 220 by the NMS 200;
  requesting and retrieving script templates in creating an apply list 134;
  creating, storing, requesting, retrieving, editing user parameter sets 136; and
  submitting an apply list for execution.

In selecting target entities for configuration, the NMS 200 provides 220 network maps generated from managed entity instances 216 registered with the NMS 200 and. relationships 214 therebetween.

This list of script templates 122 selected for managed entity configuration, is hereinafter referred to as an "apply list". The script management system 100 enforces network management personnel authorizations in selecting script templates 122 for inclusion in an apply list. As the script templates 122 in an apply list are populated with valid parameters, the apply list prior to actual transmission for execution 232 on the target managed entity 230 includes an ordered (sequenced) list of actual CLI commands.

Having selected at least one script template 122 for inclusion in an apply list, network management personnel is presented with the opportunity to specify values for user parameters of user parameters sets 128 corresponding to the script template 122. Network management personnel therefore prepares a list of actual CLI commands for execution on a target managed entity 230 without requiring extensive knowledge of the CLI commands.

The user parameters sets 128 can be stored in, and subsequently retrieved (136) from the script repository 120 allowing re-application of scripts using the same user parameter sets 128 at a later time. Multiple versions of user parameter sets 128 may be stored in the script repository 120 for each script template 122. Each apply list is submitted 138 for execution via a managed entity configuration management module 140 of the script management system 100.

In accordance with information held in the dependency tables 126 corresponding to all script templates 122 in a particular apply list, an script sequencer 150 correctly orders (sequences) the resulting CLI command scripts to be executed on target managed entities requesting, retrieving, and inserting 152 any additional prerequisite script templates 122 not initially selected by the network management personnel.

In accordance with the exemplary embodiment of the invention, all storage in, and retrievals from, the script repository 120 are brokered 134, 136, 146 and 152 through a versioning module 160 which ensures appropriate script template versions being applied to each target managed entity 232 in accordance with a make, type, and software release thereof, and further ensures appropriate user parameter set versions being used to populate the script templates 122.

In accordance with the exemplary embodiment of the invention, in validating 146 a submitted 138 apply list, the managed entity configuration management module 140 in combination with the versioning module 160, in finding a discrepancy, specifically prompt 148 network management personnel to supply user parameter values in respect of inserted script templates 122 and for additional command parameters of an updated CLI command when these are not available in a user parameter set 128 corresponding to a script template 122 previously employed in configuring a corresponding managed entity 232 in accordance with a previous version of the updated CLI command. The versioning functionality enables independent script template 122 modification and ensures the validity of saved user parameter sets 128 being applied to managed entities 232.

Further, when an old version user parameter set 128 is specified for use in respect of an updated corresponding script template 122, the script management system 100: disregards extra user parameters, if any, in the parameter set 128.

Therefore, analysts only need to update relatively short, simple, configuration task specific CLI command script templates 128 with each managed entity software update. Even in respect of an updated managed entity software, network management personnel is provided with means to prepare lists of actual CLI commands for execution on a target managed entity 230 without the network management personnel requiring extensive knowledge of the CLI command sets.

Prior to submitting the apply list for execution, the managed entity configuration management module 140 requests and retrieves 142 target managed entity parameters 212 from the NMS DB 210 associated with the NMS 200 based on NMS ParameterIDs specified and populates 144 each script template 122 in the apply list to generate a custom CLI command script for each specific target managed entity 232.

In the process of validating the apply list, inserting new script templates 122, ordering the script templates 122, populating user parameters with values, populating the NMS parameters with values, requesting user parameter values, the network management personnel is provided, for inspection, with a correctly ordered progressively complete list of CLI commands to be executed in configuring the target managed entity(ies).

In submitting scripts for execution on the target managed entity 232, CLI command sequences specified in scripts having no script execution dependency table entries are submitted for execution first, the rest of the CLI command sequences are submitted only after all prerequisite CLI scripts have been executed in accordance with execute before dependency specifications associated therewith, thereby greatly reducing the extent of CLI configuration knowledge the network management personnel is required to have.

Without limiting the invention, it is expected that some CLI script templates 128 in the script repository 120 may have empty script dependency tables 126; and that some CLI script templates 128 may include CLI commands not requiring any user parameters and/or NMS parameters to be specified.

In accordance with the exemplary embodiment of the invention, a communications network operator is provided with the means to configure a diverse set of CLI configurable managed entities 232 employed in a corresponding managed communications network 220 at reduced costs. Further, it enables the communications network operator to configure new managed entities and features more quickly than employing NMS-based approaches without requiring managed entity modeling to provide support for the new features in that an analyst need only change and/or add a specific CLI script template 128 in respect of the new managed entity and/or feature. Managed entity diversity in the communications network 220 is addressed via the versioning functionality regardless whether the diversity is found in the make of the managed equipment 232, the type, and/or the software release thereof.

The embodiments presented are exemplary only and persons skilled in the art would appreciate that variations to the above described embodiments may be made without departing from the spirit of the invention. The scope of the invention is solely defined by the appended claims.

We claim:

1. A method of configuring a communications network managed entity comprising:
   selecting at least one parameterized command script template from a plurality of parameterized command script templates based on a configuration task to be performed on the managed entity;
   selecting a user parameter set from a plurality of user parameter sets, each of said user parameter sets having a version identifier, whereby multiple versions of said user parameter sets correspond to each of said parameterized command script templates;
   populating the selected parameterized command script template with appropriate user parameter set versions to derive a command script in respect of the configuration task;
   submitting the command script to the managed entity for execution;
   ignoring extra user parameters in the user parameter set when an old version of the user parameter set is used with a modified parameterized command script template; and
   requesting additional user parameter values to be entered when discrepancies arise between a command script template version identifier and the user parameter set version identifier.

2. The method claimed in claim 1, further comprising:
   retrieving at least one parameter value from a repository.

3. The method claimed in claim 2, further comprising:
   retrieving the user parameter set including a plurality of user parameter values for the selected parameterized command script template.

4. The method claimed in claim 3, further comprising:
   determining that a user parameter value is missing when the user parameter value is not provided in the user parameter set; and
   prompting a user to enter the missing user parameter value to populate the selected parameterized command script template.

5. The method claimed in claim 4, further comprising:
   storing user parameter set versions in a script repository.

6. The method claimed in claim 5, wherein each parameterized command script template has an associated version, and, in retrieving the user parameter sets, the method further comprises:
   comparing the command script template version with the user parameter set version; and
   selectively re-entering a user parameter in the user parameter set when the user parameter set version has changed.

7. The method claimed in claim 1, further comprising:
   populating the selected parameterized command script template with at least one network management system parameter value to derive a command script in respect of the configuration task.

8. The method claimed in claim 7, further comprising:
retrieving a network management system parameter value.

9. The method claimed in claim 8, further comprising:
requesting the network management system parameter value from one of a network management system and a network management system database.

10. The method claimed in claim 1, further comprising:
retrieving the at least one selected parameterized command script template from a script repository.

11. The method claimed in claim 10, wherein selecting more than one parameterized command script template, the method further comprises:
generating an apply list of command scripts.

12. The method claimed in claim 11, wherein a parameterized command script template further includes:
a script execution dependency specifying command scripts required to be executed before a corresponding command script, the method further comprising:
ordering the plurality of parameterized command script templates in the apply list.

13. The method claimed in claim 12, further comprising:
determining that said script execution dependency specifies a command script not currently a member of the apply list; and
retrieving a corresponding parameterized command script template from said script repository for inclusion in the apply list.

14. A script management system comprising:
a script repository embedded in a computer-readable recording medium, the script repository retrievably storing a plurality of parameterized command script templates and user parameter sets, each of said user parameter sets having a version identifier, whereby multiple versions of user parameter sets are stored in said script repository for each of said parameterized command script templates, wherein at least one command constituent of each of said parameterized command script templates specifies the user parameter set version identifier;
a managed entity configuration management module populating said parameterized command script templates to derive corresponding command scripts, the managed entity configuration management module further requesting additional user parameter values to be entered when discrepancies arise between a command script template version identifier and the user parameter set version identifier; and
a versioning module ensuring that appropriate user parameter set versions are used to populate the parameterized command script templates and ignoring extra user parameters in an old version of a user parameter set when the old version of said user parameter set is used with a modified parameterized command script template.

15. The script management system claimed in claim 14, further comprising:
a managed entity configuration human-machine interface for:
entering a user parameter value for the user parameter set version identifier,
saving the user parameter value with the script repository,
optionally requesting the user parameter value from the script repository,
optionally retrieving the user parameter value from the script repository,
optionally editing the user parameter value, and
optionally deleting the user parameter value.

16. The script management system claimed in claim 15, wherein:
the parameterized command script template is stored in the script repository along with the command script template version identifier,
user parameter values corresponding to the at least one command constituent of the parameterized command script template are stored in a user parameter set having the user parameter set version identifier, and
the versioning module inspects the command script template version identifier and the user parameter set version identifier to ensure correspondence therebetween.

17. The script management system claimed in claim 14, wherein said at least one command constituent of the parameterized command script template further specifies a network management system parameter identifier, and the managed entity configuration management module further comprises:
means for obtaining a corresponding managed entity parameter value from one of a network management system and a network management system database.

18. The script management system claimed in claim 14, wherein each parameterized command script template further comprises:
an associated script execution dependency that specifies at least one command script required to be executed in advance thereof, the script management system further comprising:
a script sequencer inspecting the script execution dependency of at least one command script,
the command script being derived from a corresponding parameterized command script template, to determine whether at least one additional command script is required to be executed in advance thereof;
a submitted command script and the additional command scripts representing an apply list of scripts,
the script execution dependency and the script sequencer enabling use of specific parameterized command script templates in respect of discrete configuration tasks,
wherein script execution dependency combinations specify complex managed entity configurations tasks.

19. The script management system claimed in claim 18, comprising:
a script execution dependency table.

20. The script management system claimed in claim 18, wherein the managed entity configuration management module further submits sequenced command scripts to at least one target managed communications network entity for execution in configuring thereof.

21. The script management system claimed in claim 20, said system further comprising:
a managed entity configuration human-machine interface including means for:
target managed entity selection,
parameterized command script template selection, and
submission of the parameterized command script template selection for configuration of the at least one selected target managed entity to the managed entity configuration management module.

22. The script management system claimed in claim 21, wherein each target managed entity comprises one of:
a router, an interface, a routing protocol, and an Internet Protocol (IP) link.

23. The script management system claimed in claim 14, further comprising an analyst human-machine interface including means for:
  parameterized command script template creation,
  submission of the parameterized command script template to the script repository for storage,
  optional retrieval of the parameterized command script template, and
  optional modification of the parameterized command script template.

24. The script management system claimed in claim 23, the analyst human-machine interface further including:
  means for creating parameterized command script templates.

25. The script management system claimed in claim 23, wherein the parameterized command script template creation means provides parameterized command script templates in accordance with one command interface language select from a group consisting of:
  Command Line Interface (CLI),
  eXtensible Markup Language (XML),
  Node Management Terminal Interface (NMTI), and
  Transaction Language 1 (TL1).

26. The script management system claimed in claim 23, the analyst human-machine interface further including:
  means for specifying script execution dependency.

27. The script management system claimed in claim 23, the analyst human-machine interface further including:
  means for specifying command script execution authorization in respect of the parameterized command script template.

28. An analyst human-machine interface, embedded in a computer-readable recording medium, for communications network managed entity configuration comprising means for:
  creating a parameterized command script template:
  submission of the parameterized command script template to a script repository for storage;
  submission of multiple versions of user parameter sets to the script repository for storage, each of said user parameter sets having a version identifier;
  retrieval of the parameterized command script template and the user parameter sets;
  modification of the parameterized command script template;
  ensuring that appropriate versions of the user parameter sets populate the parameterized command script template;
  ignoring extra user parameters in the user parameter set when an old version of the user parameter set is used with a modified command script template; and
  requesting additional user parameter values to be entered when discrepancies arise between a command script template version identifier and the user parameter set version identifier.

29. The analyst human-machine interface claimed in claim 28, further including:
  means for specifying parameterized command script templates.

30. The analyst human-machine interface claimed in claim 28, further including:
  means for specifying script execution dependency for respective parameterized command script templates.

31. The analyst human-machine interface claimed in claim 28, further including:
  means for specifying command script execution authorization for respective parameterized command script templates.

32. The analyst human-machine interface claimed in claim 28, wherein said parameterized command script template creation means specifies parameterized command script templates in accordance with one command interface language selected from a group consisting of:
  Command Line Interface (CLI),
  eXtensible Markup Language (XML),
  Node Management Terminal Interface (NMTI), and
  Transaction Language 1 (TL1).

33. A managed entity configuration human-machine interface embedded in a computer-readable recording medium, comprising means for:
  parameterized command script template selection from a group of parameterized command script templates and user parameter sets, each of said user parameter sets having a version identifier, whereby multiple versions of said user parameter sets correspond to each of said parameterized command script templates;
  submission of the parameterized command script template selection for the configuration of at least one target managed entity;
  ensuring that appropriate user parameter set versions populate the parameterized command script templates;
  ignoring extra user parameters in the user parameter set when an old version of the user parameter set is used with a modified parameterized command script template; and
  requesting additional user parameter values to be entered when discrepancies arise between a command script template version identifier and the user parameter set version identifier.

34. The managed entity configuration human-machine interface claimed in claim 33,
wherein at least one command constituent of the parameterized command script template specifies the user parameter set version identifier, and
  the managed entity configuration human-machine interface further comprises means for:
    entering a user parameter value,
    submitting the user parameter value for storage in a script repository,
    optionally retrieving the user parameter value from the script repository,
    optionally editing the user parameter value, and
    optionally deleting the user parameter value.

35. The managed entity configuration human-machine interface claimed in claim 33, further comprising:
  means for target managed entity selection from a group of managed communications network entities.

36. The managed entity configuration human-machine interface claimed in claim 35, wherein each target managed entity comprises one of:
  a router,
  an interface,
  a routing protocol, and
  an Internet Protocol (IP) link.

37. A computer-readable recording medium comprising:
  at least one parameterized command script template comprising an associated version specification;
  a plurality of user parameter sets, each of said user parameter sets comprising a version identifier, whereby multiple versions of said user parameter sets correspond to said parameterized command script template;
  instructions for ignoring extra user parameters in the user parameter set when an old version of the user parameter set is used with a modified parameterized command script template; and instructions for requesting additional user parameter values to be entered when discrepancies arise between a command script template version identifier and the user parameter set version identifier.

38. The recording medium claimed in claim 37, wherein at least one parameterized command script template of a plurality of parameterized command script templates further comprises:

a script execution dependency specifying another command script derived from one other parameterized command script template to be submitted for prior execution.

39. The recording medium claimed in claim 37, wherein the at least one parameterized command script template is specified in accordance with one command interface language selected from a group consisting of:

Command Line Interface (CLI), eXtensible Markup Language (XML),

Node Management Terminal Interface (NMTI), and

Transaction Language 1 (TL1).

* * * * *

UNITED STATES PATENT AND TRADEMARK OFFICE
CERTIFICATE OF CORRECTION

PATENT NO. : 7,581,207 B2  Page 1 of 1
APPLICATION NO. : 10/726532
DATED : August 25, 2009
INVENTOR(S) : Bolder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1307 days.

Signed and Sealed this

Fourteenth Day of September, 2010

David J. Kappos
*Director of the United States Patent and Trademark Office*